United States Patent
Breuel et al.

(10) Patent No.: US 10,730,511 B2
(45) Date of Patent: Aug. 4, 2020

(54) COMMUNICATION DEVICE, CONTROL DEVICE, AND SYSTEM FOR VEHICLE

(71) Applicant: VOLKSWAGEN AG, Wolfsburg (DE)

(72) Inventors: Matthias Breuel, Mannheim (DE); Arndt Böhme, Gifhorn (DE)

(73) Assignee: Volkswagen AG (DE)

( * ) Notice: Subject to any disclaimer, the term of this patent is extended or adjusted under 35 U.S.C. 154(b) by 190 days.

(21) Appl. No.: 15/190,776

(22) Filed: Jun. 23, 2016

(65) Prior Publication Data
US 2016/0375898 A1 Dec. 29, 2016

(30) Foreign Application Priority Data
Jun. 24, 2015 (DE) .................. 10 2015 211 642

(51) Int. Cl.
| | |
|---|---|
| *B60W 30/06* | (2006.01) |
| *G08C 17/02* | (2006.01) |
| *B60L 53/30* | (2019.01) |
| *B60L 53/60* | (2019.01) |
| *G07C 5/00* | (2006.01) |
| *G08G 1/14* | (2006.01) |
| *E05F 15/77* | (2015.01) |

(52) U.S. Cl.
CPC ............ *B60W 30/06* (2013.01); *B60L 53/30* (2019.02); *B60L 53/60* (2019.02); *E05F 15/77* (2015.01); *G07C 5/008* (2013.01); *G08C 17/02* (2013.01); *G08G 1/149* (2013.01); *G08C 2201/93* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
None
See application file for complete search history.

(56) References Cited

U.S. PATENT DOCUMENTS

| | | | | |
|---|---|---|---|---|
| 5,565,843 A | * | 10/1996 | Meyvis .................... | G08B 5/36 340/326 |
| 2008/0012515 A1 | * | 1/2008 | Murray .............. | G07C 9/00174 318/466 |
| 2011/0193680 A1 | * | 8/2011 | Summerford .......... | G08C 17/02 340/5.51 |
| 2012/0091959 A1 | * | 4/2012 | Martin ................ | B60L 11/1829 320/109 |

FOREIGN PATENT DOCUMENTS

| | | |
|---|---|---|
| DE | 102006002391 A1 | 7/2007 |
| DE | 102012217258 A1 | 4/2013 |
| DE | 102013016880 A1 | 7/2014 |
| WO | 2013019989 A2 | 2/2013 |

OTHER PUBLICATIONS

Search Report for German Application No. 10 2015 211 642.5; dated Mar. 7, 2016.

* cited by examiner

*Primary Examiner* — Curtis A Kuntz
*Assistant Examiner* — Shawna M Kingston
(74) *Attorney, Agent, or Firm* — Barnes & Thornburg LLP

(57) ABSTRACT

A communication device having a wireless receiver configured to receive first signals from a vehicle and a wireless transmitter wherein the communication device transmits second signals containing information about a state of the vehicle to an external information device on the basis of the first signals via the wireless transmitter.

8 Claims, 3 Drawing Sheets

COMMUNICATION DEVICE, CONTROL DEVICE, AND SYSTEM FOR VEHICLE

PRIORITY CLAIM

This patent application claims priority to German Patent Application No. 10 2015 211 642.5, filed 24 Jun. 2015, the disclosure of which is incorporated herein by reference in its entirety.

SUMMARY

Illustrative embodiments relate to a communication device, control device and a system for the field of vehicles.

BRIEF DESCRIPTION OF THE DRAWINGS

The disclosed embodiments will be described in detail below with reference to the appended drawings.

DETAILED DESCRIPTION

Figure 1:
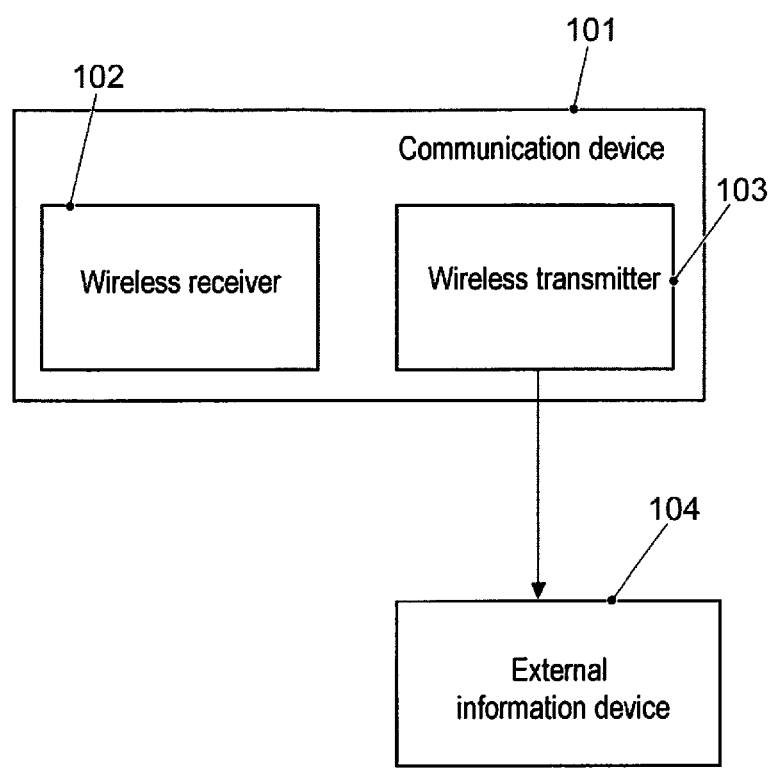
FIG. 1 shows a schematic illustration of a communication device according to at least one disclosed embodiment.

At present, significant advances have been made in the development of automatic driving and parking devices for vehicles. In this context, in the case of new developments the driver can, for example, when parking his vehicle in his own garage, remain standing outside the garage.

In addition, the concept according to which a charging process for an electric vehicle is started after the automatic parking by an inductive charge plate being automatically moved under the vehicle is already known.

The processes such as parking and charging are not yet terminated when the vehicle is in a stationary state since, for example, the vehicle still has to be connected to the charging plate or the garage door has to be closed after the parking process.

Here, even if the driver is located outside the vehicle he has to be informed about the state in which the vehicle is in and when the above-mentioned processes, for example, the abovementioned parking process or the charging process is terminated.

The indication of the state of the vehicle can be implemented, for example, by means of a display on a smartphone by means of an application ("app") installed on the smartphone or else by means of a smartwatch.

However, the driver must have a smartphone with the corresponding app or a smartwatch and must implement a corresponding control process from there. If, for example, the positioning of the vehicle is initiated by means of a smartphone, the driver must firstly take his smartphone, for example, out of his pocket, unlock it, call the suitable app and wait for a corresponding synchronization process. These processes can be very time-intensive. During the synchronization, it is also possible for waiting times to occur, as can a breaking off of communication when the vehicle is driven into the garage. Furthermore, it requires direct communication with the vehicle, for example, via WLAN, for which the operator must be in the vicinity.

In other variants, light elements or displays on the vehicle can display the state. When light elements or displays on the vehicle are used, the driver must, according to the present legislation, still be within sight. In future, this direct monitoring will possibly no longer be necessary with improved technology.

Document DE 10 2012 217 258 A1 discloses a vehicle guiding system. The vehicle guiding system is provided with a controller which is configured to receive input signals which indicate and instantaneous charging connection position with respect to an external charging pad and a charging status. The controller is also configured to transmit a vehicle status signal in reaction to the input signals. An interface is connected to the controller and is configured to display a vehicle position indicator and a charging status report in reaction to the vehicle status signal.

According to this document, a device for transmitting electrical energy to the vehicle, which is arranged outside the vehicle, is referred to as the charging pad, wherein the charging pad preferably serves to perform inductive charging of the vehicle battery.

DE 10 2006 002 391 A1 relates to a method and to a device for the remote control of vehicle functions and for carrying out diagnostic functions on vehicles. In the disclosed embodiments, after the inputting of a remote control function or a request for a diagnosis, a control device of the mobile remote control and diagnostic unit firstly activates the transceiver unit for the close range in a first method operation, and only activates the transceiver unit for the far range in a second method operation when a close range connection does not come about.

DE10 2013 016 880 A1 relates to a method for positioning a vehicle at an inductive charging station. In this context, when the vehicle approaches the charging station, a first wireless communication connection is set up for a first transmission of data between the vehicle and at least one charging location of the charging station as soon as the vehicle is in communication range with the at least one charging location, wherein by evaluating the transmission of data a position of the vehicle relative to the at least one charging location is determined and the vehicle is moved manually or automatically to the at least one charging location of the charging station as a function of the determined position.

Document WO 2013/019989 A2 discloses a battery charging system for an electric vehicle. Here, an addressable RFID tag, an RFID receiver, an electric charging device and a control device are configured to control the charging of the battery of an electric vehicle, in accordance with a user profile and a charging profile in response to a signal which has been received from the RFID tag by the RFID reading device. In a system which is connected together, a plurality of charging stations are connected here to a power system and communicate with a central control device by means of communication connections.

According to this document, a computer-controlled network of charging stations and clients, which can comprise a client portal, can be made available. The client portal can comprise a mobile display device or a receiver or could also be a screen terminal which is connected to a charging station. The display device can display, for example, the charging state of the electric vehicle, a projected range of the vehicle and the costs per kWh of the charging at the charging station. A transceiver can additionally make available a wireless communication with the electric vehicle, a charging station and/or a network control system.

According to the above documents, the state of a vehicle, for example, the displaying of the charging state, is correspondingly displayed in the vicinity of the vehicle with the result that the driver has to be within sight of the vehicle. However, this is not desirable, in particular in the case of relatively long processes.

Disclosed embodiments make available devices and a corresponding system which permit a driver to be remote from the vehicle, wherein the driver can still receive the relevant information.

Disclosed embodiments provide a communication device, a control device, and a system.

The disclosed communication device comprises a wireless receiver which is configured to receive first signals from a vehicle. The communication device also comprises a wireless transmitter.

The communication device is configured to transmit second signals, containing information about a state of the vehicle, to an external information device on the basis of the first signals via the wireless transmitter.

The communication device comprises an interface for actuating a garage door, wherein the garage door is actuated as a function of the first signals. Alternatively or additionally, the first signals are signals of a "universal garage door opener" (UGDO).

In particular in the case of automatic parking of a vehicle, for example, parking of the vehicle in a garage and/or an automatic charging process, for example, in the case of an electric vehicle, the driver no longer has to be within sight of the vehicle as a result of the transmission of the information about the state of the vehicle, for example, as to whether an automatic parking process is terminated, to an external information device by means of a communication device. The driver can, for example, while his vehicle is being automatically parked, be informed, in the surroundings of the vehicle, about the state of his vehicle via a display, which signifies a high level of convenience for the driver.

All the information about the state of the vehicle can not only be transmitted directly over a comparatively small range from the vehicle to an output device which is located in the direct vicinity of the vehicle, such as, for example, to a garage, but can also, as it were, be transmitted by means of the communication device over a comparatively large range to an information device which is further away and does not have to be located in the direct vicinity of the vehicle.

In addition, a transmitter permits, on the one hand, the transmission of the information about the state of the vehicle and, on the other hand, transmission of a signal to a device, for example, to a garage which can then be opened or closed automatically.

By displaying this information by means of an external information device, processes such as the automatic parking and/or charging of the vehicle can be automated completely for the driver. For example, an automatic charging process of an electric vehicle can be connected to an automatic parking process when the parking process is completely terminated. As a result of the complete automation of both processes, the driver does not have to wait for the termination of the first process, that is to say the parking process, before the second process, that is to say the charging process, starts. As a result, a saving of time is produced for the driver. No waiting times arise for the driver, such as, for example, waiting until the parking process of the vehicle is terminated or until the charging unit has been connected to the electric vehicle and the charging has been started.

In this context it is possible to actuate, for example, a receiver which is permanently installed in a garage door and which can then pass on the received signal, for example, to an output device, for example, to a lighting device, to display the status which is transferred from the vehicle, or to bring about automatic opening or closing of the garage.

An automatic garage door opener can comprise a transmitter unit, for example, a UGDO transmitter unit which transmits a signal, for example, to a sensor on the garage door, to open or close the garage door automatically. The UGDO transmitter unit transmits standardized signals here.

The UGDO transmitter unit is installed on a standard basis in newer vehicles, with the result that no new hardware components are required.

A parking device which is integrated into the vehicle can, for example, tell the UGDO transmitter unit that a vehicle is to be parked in a garage, with the result that the UGDO transmitter unit then automatically opens the garage so that the vehicle can drive in. After the termination of the successful parking process, that is to say when the vehicle has reached its correct parked position, the parking device can communicate this to the UGDO transmitter unit and then make it close the garage door.

As a result of the automatic opening and closing, the driver does not additionally have to do this himself, and after initiating the parking process he can, for example, enter his house and stay there without having to maintain constant visual contact with the vehicle. Accordingly, the automatic opening and closing of the garage door constitutes a considerable benefit for the driver.

The electric vehicle can communicate, for example, the necessary parameters such as the parking status and/or charging status via an on-board means transmitter unit, here the integrated UGDO transmitter unit.

According to at least one disclosed embodiment, a control device for a vehicle can comprise a controller for controlling the parking and starting of a charging process of the vehicle. The control device can also comprise a wireless transmitter for transferring information about the state of the vehicle, wherein the wireless transmitter can be configured to transmit signals containing information about a state of a vehicle wirelessly, wherein the state can comprise a parked state and/or a charging state of the vehicle and can be configured to transmit signals for opening and/or closing a garage door.

In particular, therefore just one transmitter is necessary for the garage and the vehicle. On the one hand, the transmitter can transmit information about the state of the vehicle to the garage and/or a communication device, wherein this information can be output and/or automatic opening or closing of the garage door is brought about.

The control device, which is usually installed on a standard basis in vehicles, permits complete automation of the parking process and/or charging process, which constitutes a high level of convenience for the driver.

The wireless transmitter can, for example, actuate a display device on a garage door, wherein the display device comprises standard components such as, for example, LED lighting elements which are attached to the garage door and display the state of a parking process and/or charging process of the vehicle. The display device can then indicate visually the status of the parking process and/or charging process to the driver, for example. Since the display device is located on the garage door, the driver can be informed about the status of the parking process and/or charging process of his vehicle without the driver having to have direct visual contact with the vehicle.

According to at least one disclosed embodiment, a control device can be characterized by virtue of the fact that the wireless transmitter is part of a universal garage door opener.

Automatic opening or closing of the garage door by means of a universal garage door opener provides a high level of convenience for the driver since the opening or closing does not have to be carried out by the driver himself. After the driver has initiated a parking process, for example, by means of his vehicle key, he can firstly determine by means of the control device whether the garage door is opened or closed, and subsequently in the event of a closed garage door can transmit a signal to the garage door to open the garage automatically. After the termination of the successful parking process in the garage, the wireless transmitter can transmit a signal to the garage door to close the garage. During the entire process it is not necessary for the driver to be involved, since the process proceeds in a fully automated state.

According to at least one disclosed embodiment, a system can comprise a communication device and a control device for a vehicle, having a wireless transmitter for transmitting the first signal, wherein the wireless transmitter of the control device has a smaller range than the wireless transmitter of the communication device.

This system permits a completely automated sequence of a parking process and/or of a charging process and informs the driver at any time about the progress of the processes such as, for example, the parking process. For example, it can be displayed whether the process of parking in the garage is terminated and/or a charging process has been started.

This information, that is to say the first signals, can be displayed to the driver, for example, in the direct vicinity of the vehicle, for example, by means of a display device on a garage door.

The wireless transmitter of the control device can transmit, over a short range here, the first signals to the communication device which is located directly at the garage. The communication device can be installed, for example, on the garage roof.

According to at least one disclosed embodiment, the range of the wireless transmitter of the communication device can be greater than 5 meters.

The relatively large range of the wireless transmitter of the communication device permits the signal to be transmitted from the communication device to a receiver which is further away and is not located in the direct vicinity of the vehicle. If this signal contains, for example, information about the state of the vehicle such as, for example, the parked state or the charging state of the vehicle, the state can therefore be communicated to the driver without the driver having to be located in the direct vicinity of the vehicle.

According to at least one disclosed embodiment, the control device which is integrated into the system can be configured as described above.

The control device, integrated into the system, for a vehicle has the same benefits as the control device which have already been discussed.

According to at least one disclosed embodiment, the system can be characterized by an external information device.

The external information device can be located further away from the vehicle and can be installed, for example, in a house. The information relating to the state of the vehicle can then be transmitted to this information device and correspondingly further processed.

Such an information device can already be permanently installed in a house, that is to say for the transmission and reception of the information, for example, from the communication device to the external information device, there is no need for any additional installation of components such as, for example, a receiver.

According to at least one disclosed embodiment, the information device can comprise an output device, wherein the output device can have a radio clock and/or a cell phone and/or lighting elements, and/or the external information device can be connected to a home network.

This disclosed embodiment uses here systems in houses which can already be integrated on a standard basis in home network systems, as a result of which no additional components have to be installed. The external information device can be connected directly to a home network here.

The information device can communicate here, for example, with a home network base and transfer, for example, the status of the parking process. Lamps and/or lighting elements which are installed, for example, on the walls and/or ceilings of a house and/or of an apartment can subsequently be activated and display the corresponding status.

The display device can comprise, for example, lighting elements which are already pre-installed in a house of the driver. The termination of a parking process can be signalled, for example, by lighting up of the lighting elements on the ceiling of the house or on a wall, for example, a green light can indicate the terminated parking process.

The indication of successful execution of the parking process and/or charging process of the vehicle is therefore not restricted only to the vehicle but rather relates to the further surroundings of the vehicle, that is to say includes, for example, the driver's house.

The driver who is possibly already located in the house during the automated parking process can therefore be conveniently informed about when his vehicle is correctly parked and can additionally be informed, for example, that the charging process has started. The successful termination of the charging process can then also be indicated by means of a lamp, for example.

In at least one development of the disclosed embodiment, the communication of the vehicle or the transmission of information of the communication device can be embodied by local radio connections such as, for example, WLAN, Bluetooth or others.

Alternatively, outputting can also take place, for example, via a cell phone which the driver, for example, carries on his person or which is located in the house.

However, the indication can also be given via a digital unit such as, for example, a radio clock.

According to at least one disclosed embodiment, a method is additionally made available in which first signals are received by a vehicle with a wireless receiver, and second signals are transmitted to an external information device via a first wireless transmitter on the basis of the first signals, wherein the second signals contain information about a state of the vehicle, and wherein the first signals are transmitted by a vehicle with a second wireless transmitter, wherein the second wireless transmitter has a shorter range than the first wireless transmitter.

The method has the same benefits as the system which have already been discussed.

Exemplary embodiments are explained in detail below with reference to the appended drawings. These exemplary embodiments constitute only examples and are not to be interpreted as being restrictive. While, for example, the exemplary embodiments are described in such a way that they comprise a multiplicity of features and elements, a number of these features may be omitted in other exemplary embodiments and/or replaced by alternative features or elements. In other exemplary embodiments, additional or alternative additional features or elements may be provided in addition to those explicitly described. Variants or modifications which relate to one or more exemplary embodiments can also be applied to other exemplary embodiments unless stated otherwise.

FIG. 1 shows a schematic illustration of a communication device 101.

The communication device 101 comprises a wireless receiver 102 and a wireless transmitter 103.

The wireless receiver 102 can receive a signal from a control device which is integrated in a vehicle. The control device can be integrated in a vehicle shown in FIG. 2.

Signals are fed here from the communication device 101 to an external information device 104 which is located in the vicinity of the vehicle.

The transmitter of the communication device 101 can comprise, for example, an antenna, via which a signal can be transmitted to the external information device 104, wherein the external information device 104 itself can also comprise an antenna.

The external information device 104 can be connected to a home network which can actuate various elements in a house, wherein the elements can be, for example, lamps, LED lights or displays.

The communication device 101 can, for example, transmit a signal to a garage door or a garage in which the vehicle is located. The transmitted signals can be, for example, signals of the control device which is integrated into the vehicle, which signals make available information about a state of the vehicle. The state of the vehicle indicates, for example, whether the vehicle has reached a desired parked position or whether an automatic charging process has started.

This information can then be transmitted to the external information device via the wireless transmitter 103 of the communication device 101.

Figure 2:
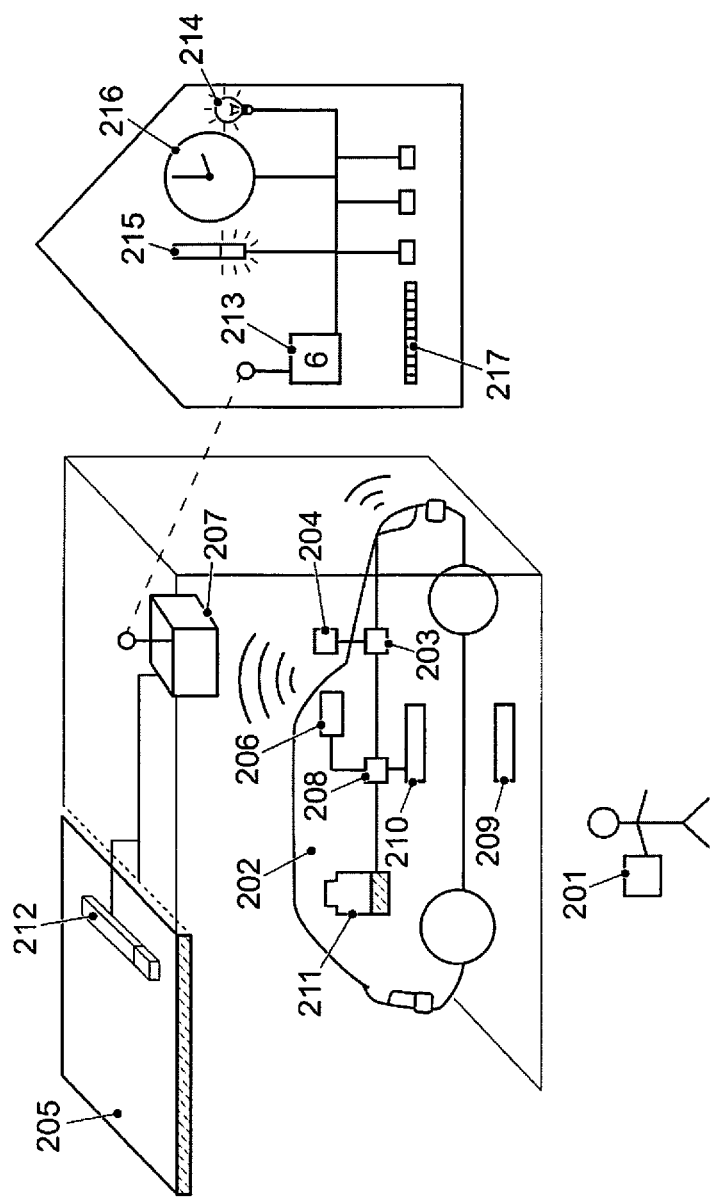
FIG. 2 shows a schematic illustration of a system according to at least one disclosed embodiment.

A system according to a disclosed embodiment is shown in FIG. 2.

A vehicle is intended to be parked automatically on a piece of ground, for example, in a garage, and a battery of the vehicle is possibly to be subsequently charged, if the vehicle is an electric vehicle. For this purpose, the driver does not have to be located in the vehicle and can, for example, after he has left the vehicle, give the instruction from the outside for the automatic parking process to be started.

To start this process, the driver requires, for example, a vehicle key 201. The vehicle key which comprises a radio function initiates in this context an automatic parking and/or charging process of the vehicle 202, for example, of the electric vehicle.

The vehicle 202 is then parked automatically by means of a controller device 203. The parking can be, for example, parking in a garage. The automatic parking can occur from the boundary of the piece of ground and therefore starting from the junction with a road.

Signals of the controller 203 are fed to a sensor device 204 here. The sensor device 204 can comprise, for example, distance sensors which determine how large the distance from the vehicle to an obstacle is, for example, the distance of the vehicle from a wall of the garage. The sensor device 204 can also comprise cameras which can perceive the surroundings of the vehicle and can register, for example, whether or not a garage door 205 is closed.

If the garage door 205 is closed, the controller 203 transmits a signal to an integrated garage door opener, to what is referred to as a UGDO "Universal Garage Door Opener," i.e., a wireless transmitter 206. The garage door opener permits automatic opening of the garage door or automatic closing.

The wireless transmitter 206 transmits a signal to a communication device 207 which automatically opens the garage door 205. During opening of the garage door 205, the process of parking can continue to take place, with the result that no additional waiting times are necessary. After the opening of the garage door 205, the vehicle 202 can be driven automatically into the garage.

When the parking process is terminated, that is to say the vehicle 202 has assumed the correct parked position, a signal is transmitted from the controller 203 to a charging control device 208.

The charging controller device 208 connects a first charging plate 209, which is installed in the floor of the garage, to a second charging plate 210 which is installed in the vehicle 202. After the termination of the connecting process of the two charging plates, a charging process of a vehicle battery 211, which is integrated in the vehicle 202, starts.

Further processes can be carried out during the charging process. For example, automatic cleaning of the vehicle 202 can be performed, for example, external and/or internal cleaning of the vehicle 202. The cleaning can be carried out, for example, by means of autonomous vacuum cleaning and/or polishing robots, similar to what is referred to as the "Robo Celaneraen" for automatic cleaning of living spaces.

Once the parking process is terminated and the charging process has been initiated, the controller 203 and the charging control device 208 transmit a signal to the wireless transmitter 206 to the effect that the parking process is completely terminated and the charging process has been initiated.

The wireless transmitter 206 subsequently sends the instruction to close the garage door 205 to the communication device 207, which in turn sends the signal to close the garage door 205 automatically.

Alternatively, a process of determining the location of the vehicle can be based on GPS positioning. However, the determination of location by means of GPS is not as precise as the precise indication of position of the vehicle to the effect that it is located within the garage, this being ensured by all the sensors in the parking process, and then transmits the successful process for the disclosed system.

The communication device 207 can transmit the signals using WLAN, for example.

Furthermore, further information can be transmitted via the wireless transmitter 206, such as, for example, the charging state of the vehicle battery 211 and/or the information about the state of charge of the vehicle battery 211. The charging control device 208 transmits here the information about the charging state, for example, whether the charging plates are connected, whether the vehicle battery 211 is being charged and/or the information about the state of charge of the vehicle battery 211, to the wireless transmitter 206. The state of charge can be indicated, for example, in %.

The communication device 207 can, as an actuator inside the garage, actuate, for example, a lighting device which is attached to the garage door 205 or, for example, actuate lighting devices for external information devices.

The state of charge of the vehicle battery 211 can be represented, for example, by means of a light strip 212. If, for example, the state of charge of a vehicle battery 211 is ⅓, for example, ⅓ of the light strip 212 can be lit up, that is to say the display can be correspondingly illuminated depending on the state of charge. Additional or alternative pulsation of the light strip 212 can indicate the continuous charging process of the vehicle battery 211.

However, the communication device 207 does not serve here exclusively as an actuator and/or receiving unit in general but can also be configured as a distributor or transmitter unit. For this purpose, the communication device 207 is connected, for example, to an antenna which is positioned on the garage and which permits a connection to a further external information device 213 such as, for example, a "Smart Home" base in a house.

A "Smart Home" is to be understood as referring generally to devices and systems which are integrated in a house and serve to increase the quality of living/life, or also to increase safety, by means of devices and installations in or on the house, which can be controlled remotely, for example. For example, devices in the house can be controlled remotely by means of a cell phone.

The external information device 213 can output the received information of the communication device 207 optically and/or acoustically and/or haptically by means of different output devices.

After a process of parking the vehicle in the garage has ended, it is possible, for example, for a display device 214 in the house to be activated by means of the external information device 213, wherein the display device 214 can be, for example, a lamp in the house. The lamp is then switched on, for example, when the parking process is terminated. The driver who is located, for example, in the house during the parking process, is then informed, by the switching on of the lamp, that the parking process is terminated.

The output device can, for example, also comprise strips with light-emitting diodes (LEDs) 215 in the ceiling or the walls of the house. For example, the charging state of the vehicle can then be indicated visually by means of LED strips 215 in that the LED strips 215 are activated and a space or a plurality of spaces of the house are lit up partially or completely.

A display of events which take place significantly later, such as for example, an air-conditioning process of the vehicle, can also lead, for example, as a result of activation of a lamp in the corridor of the house. The charging control device 208 can be correspondingly programmed, with the result that at a specific time, for example, 6.30 am, the vehicle is heated to a desired temperature, for example, 23° C.

Digital units 216 such as, for example, smart clock displays and/or radio clocks and/or cell phones and/or televisions in the house can receive information, for example, about the charging state of the vehicle via the external information device 213 and display the information by means of a display, for example.

A driver can enter the house after the initiation of the parking process and, for example, look out of the window of his house during a period of time which is convenient for him, and can detect, via the closed garage door, whether the parking process is successfully terminated. Even more conveniently, he detects what state the vehicle is in in the garage by means of existing elements in the house such as, for example, lamps, displays and/or LED strips which are mounted, for example, on the ceiling or in the wall.

Particularly radio clocks are usually provided in many rooms in a house. Before departing with the vehicle, the driver makes a note, for example, of the time and is then informed automatically about, for example, the state of charge and, associated therewith the range of the electric vehicle and/or he is informed about the temperature which is prevalent in the interior of the vehicle.

Figure 3:
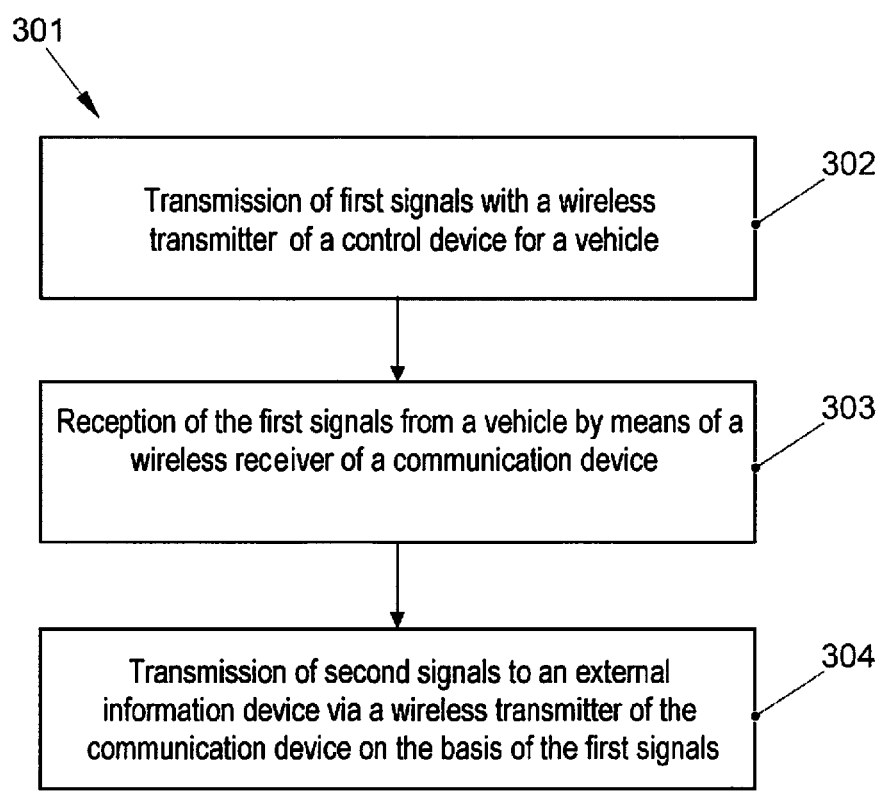
FIG. 3 shows method operations of a method according to at least one disclosed embodiment.

FIG. 3 shows the method operations at 302-304 of a method 301 which is carried out by the communication device 101 according to FIG. 1 and the control device 103 for a vehicle.

In operation 302 of the method 301, according to FIG. 3 first signals are transmitted with a wireless transmitter of a control device for a vehicle. The control device can be integrated into a vehicle here. The first signals can be transmitted, for example, to a communication device.

In operation 303 of method 301, according to FIG. 3 the first signals are received from a vehicle by a wireless receiver of a communication device. The communication device can be installed here, for example, on the roof of a garage and can comprise an antenna for transmitting and receiving signals.

In operation 304 of the method 301 according to FIG. 3, second signals are transmitted to an external information device via a wireless transmitter of the communication device on the basis of the first signals. The second signals contain information about the state of the vehicle. A state of the vehicle can be, for example, the parked state of the vehicle and/or the charging state of a battery of the vehicle.

The wireless transmitter of the control device has a shorter range here than the wireless transmitter of the communication device.

LIST OF REFERENCE NUMERALS

101 Communication device
102 Wireless receiver
103 Wireless transmitter
104 External information device
201 Vehicle key
202 Vehicle
203 Controller
204 Sensor device
205 Garage door
206 Wireless transmitter
207 Communication device
208 Charging control device
209 First charging plate
210 Second charging plate
211 Vehicle battery
212 Light strip
213 External information device
214 Display device
215 LED strips
216 Radio clock and/or cell phone
217 Light strip
301 Method
302-304 Operations

The invention claimed is:

1. A control device for a transportation vehicle, the control device comprising:
   a controller for controlling automated parking and automated starting of a charging process of the transportation vehicle; and
   a wireless transmitter for transferring information indicating a state of the transportation vehicle in signals wirelessly to an external information device located remotely from the transportation vehicle and a portable communication device, wherein the external information device is located proximate to a garage or a dwelling including the garage, wherein the transportation vehicle state comprises a parking state and/or a charging state of the transportation vehicle, and wherein the wireless transmitter is further configured to transmit signals for opening and/or closing a garage door of the garage, wherein the transportation vehicle state signals transmitted by the wireless transmitter to the external information device indicate the parking state of the transportation vehicle resulting from the automated parking of the transportation vehicle within the garage or an inductive charging state of a battery of the transportation vehicle resulting from automated inductive charging of the battery of the transportation vehicle, wherein the automated inductive charging of the battery is performed automatically in response to completion of the automated parking of the transportation vehicle without user intervention, and wherein the automated closing of garage door is performed automatically in response to completion of the automated parking of the transportation vehicle without user intervention.

2. The control device of claim 1, wherein the wireless transmitter is part of a universal garage door opener.

3. A system comprising:

a portable communication device including a wireless receiver configured to receive first signals from a transportation vehicle, and a communication device wireless transmitter, wherein the communication device wireless transmitter transmits second signals, containing information about a state of the transportation vehicle, to an external information device located remotely from the transportation vehicle and the portable communication device, wherein the external information device is located proximate to a garage or dwelling including the garage, wherein the transmission of the second signals is based on the first signals received via the communication device wireless receiver, and wherein the communication device automatically actuates a garage door of the garage as a function of the first signals; and a control device for the transportation vehicle having a control device wireless transmitter for transmitting the first signals, wherein the control device wireless transmitter has a smaller range than the communication device wireless transmitter, wherein the second signals transmitted by the wireless transmitter to the external information device indicate a state of the transportation vehicle that indicates a parking state of the transportation vehicle resulting from automated parking of the transportation vehicle within the garage or an inductive charging state of a battery of the transportation vehicle resulting from automated inductive charging of the battery of the transportation vehicle, and wherein the automated inductive charging of the battery is performed automatically in response to completion of the automated parking of the transportation vehicle without user intervention.

4. The system of claim 3, wherein the range of the wireless transmitter of the communication device is greater than 5 meters.

5. The system of claim 3, further comprising the external information device located remotely from the transportation vehicle and the portable communication device.

6. The system of claim 5, wherein the external information device comprises an output device, wherein the output device has a radio clock and/or a cell phone and/or lighting elements, and/or in that the external information device is connected to a home network.

7. The system of claim 5, wherein the external information device is configured to transmit one or more signals to initiate an automatic parking and/or an automatic charging of the transportation vehicle.

8. The system of claim 3, wherein the system further comprises a display device on the garage door, wherein the communication device wireless transmitter actuates the display device to display the state of a parking process and/or charging process of the transportation vehicle.

* * * * *